(12) United States Patent
Suzuki et al.

(10) Patent No.: US 6,452,657 B1
(45) Date of Patent: Sep. 17, 2002

(54) IN-PLANE SWITCHING SCHEME LIQUID CRYSTAL DISPLAY UNIT

(75) Inventors: Teruaki Suzuki; Shin-ichi Nishida; Masayoshi Suzuki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/395,405

(22) Filed: Sep. 14, 1999

(30) Foreign Application Priority Data

Sep. 17, 1998 (JP) ............................. 10-262931

(51) Int. Cl.[7] ..................... G02F 1/1368; G02F 1/1343; G02F 1/139
(52) U.S. Cl. ......................................... 349/141; 349/143
(58) Field of Search ........................ 349/139, 141, 349/143, 132

(56) References Cited

U.S. PATENT DOCUMENTS

| | | | |
|---|---|---|---|
| 3,807,831 A | | 4/1974 | Soref |
| 5,886,762 A | * | 3/1999 | Lee et al. ............... 349/141 |
| 6,088,078 A | * | 7/2000 | Kim et al. ............... 349/141 |
| 6,128,061 A | * | 10/2000 | Lee et al. ............... 349/141 |
| 6,188,459 B1 | * | 2/2001 | Kim ............... 349/141 |
| 6,233,034 B1 | * | 5/2001 | Lee et al. ............... 349/141 |
| 6,266,118 B1 | * | 7/2001 | Lee et al. ............... 349/141 |
| 6,281,958 B1 | * | 8/2001 | Nakajima ............... 349/141 |

FOREIGN PATENT DOCUMENTS

| | | |
|---|---|---|
| JP | 63-21907 | 5/1988 |
| JP | 5-505247 | 8/1993 |
| JP | 7-36058 | 2/1995 |
| JP | 7-239480 | 9/1995 |
| JP | 9-5793 | 1/1997 |
| JP | 9-258369 | 10/1997 |
| JP | 10-123482 | 5/1998 |
| JP | 11-190860 | 7/1999 |
| JP | 11-242233 | 9/1999 |
| JP | 11-326955 | 11/1999 |
| JP | 2000-131717 | 5/2000 |

* cited by examiner

Primary Examiner—William L. Sikes
Assistant Examiner—Tai V. Duong
(74) Attorney, Agent, or Firm—Scully, Scott, Murphy & Presser

(57) ABSTRACT

An in-plane switching scheme LCD (IPS-LCD) unit includes front and rear substrates, a LC layer sandwiched therebetween and having a uniform initial orientation alignment. The rear substrate has in each pixel area a plurality of zones formed by stripes of a pixel electrode and stripes of a common electrode. The electric fields generated by the pixel electrode and the common electrode extend alternately in opposite directions to form a checkered pattern, thereby suppressing color change due to the view angle for the LCD.

5 Claims, 7 Drawing Sheets

$\triangle n' = n' - no < ne - no$ $\triangle n' = ne - no$

IN-PLANE SWITCHING SCHEME LIQUID CRYSTAL DISPLAY UNIT

BACKGROUND OF THE INVENTION (a) Field of the Invention

The present invention relates to an in-plane switching scheme liquid crystal display (LCD) unit and, more particularly, to an in-plane switching scheme LCD unit having driving electric field parallel to substrates and achieving a wide view angle while suppressing a color change.

(b) Description of the Related Art

LCD units have advantages of smaller thickness, lower weight and lower power dissipation. Among other LCD units, an active matrix LCD unit wherein each of pixels arranged in a matrix is driven by an active element, such as a thin film transistor (TFT), is expected for use as a high-performance flat panel display unit.

A conventional active matrix LCD unit (AM-LCD) generally includes a twisted-nematic liquid crystal (TN-LC) layer and takes advantage of the electric-optical effect thereof by sandwiching the LC layer between a pair of substrates and applying the LC layer with an electric field substantially perpendicular to the surfaces of the substrates for operation of the LC layer.

U.S. Pat No. 3,807,831 discloses an AM-LCD unit using an in-plane switching scheme wherein the LC layer is operated by a lateral (in-plane) electric field parallel to the substrates. The disclosed LCD unit includes a pair of comb-shape electrodes, with the teeth of both the electrodes being alternately arranged.

Patent Publication JP-B-63-21907 discloses an AM-LCD unit which takes advantage of the electric-optical effect of the TN-LC layer. The disclosed LCD unit also includes a pair of comb-shape electrodes by which parasitic capacitance is reduced between the common electrode and the drain bus lines and between the common electrode and the gate bus lines.

FIG. 1 shows the AM-LCD unit using an in-plane switching scheme, referred to as an IPS-LCD unit hereinafter. The IPS-LCD unit includes a pair of front and rear glass substrates 11 and 12 sandwiching therebetween a LC layer 20, wherein the second substrate 12 mounts thereon a pair of comb-shape electrodes 70. By applying a driving voltage between the comb-shape electrodes 70, a lateral electric field is generated in the direction perpendicular to the extending direction of the teeth of the comb-shape electrodes 70 and parallel to the surfaces of the substrates 11 and 12. The lateral electric field rotates the orientation of the LC molecules, whereby the transmittance of the LC layer 20 is controlled in each pixel.

In the IPS-LCD unit of FIG. 1, the orientations of the LC molecules in each pixel should be determined in a specified direction by the application of the drive voltage for a stable and uniform image of the pixel. This is generally achieved by the configuration of the initial orientation $\phi_{LC0}$ of the LC molecules, which is somewhat deviated from the direction perpendicular to the direction of the lateral electric field. In other words, the LC layer 20 is subjected to an initial orientation alignment so that the initial orientation $\phi_{LC0}$ of the LC molecules is somewhat smaller than 90° from the extending direction of the teeth of the comb-shape electrodes 70.

In the description to follow, angle φ of the direction of the electric field or orientation of the LC molecules is defined from the direction perpendicular to the extending direction of the teeth, with the counter-clockwise rotation as viewed from the front substrate being the positive. The initial orientation $\phi_{LC0}$ of the LC molecules are generally determined as $45° \leq \phi_{LC0} \leq 90°$ for assuring a sufficient contrast while rotating the LC molecules by more than 45°. In the illustrated configuration of FIG. 1, the LC molecules are rotated by the driving electric field E1 in the clockwise direction as viewed from the front substrate or first substrate 11, as shown by the solid arrow, due to the initial orientation being somewhat deviated in the clockwise direction from the extending direction of the teeth of the electrodes 70.

If the LCD unit of FIG. 1 is sandwiched between a pair of polarizing plates having orthogonal polarization axes, the light transmittance T upon application of a driving voltage is expressed by the following equation:

$$T = \tfrac{1}{2} \times \sin^2\{2(\phi_P - \phi_{LC})\} \sin^2(\pi \cdot \Delta n \cdot d / \lambda) \quad (1)$$

wherein $\phi_{LC}$, $\phi_P$, Δn, d, and λ are orientation of the LC molecules upon application of the driving voltage, orientation of the passing axis of the polarizing plate disposed on the incident side of the back-light, the birefringence anisotropy of the LC layer, the cell thickness or the thickness of the LC layer, and the wavelength of the back-light, respectively. The orientation $\phi_A$ of the passing axis of the polarizing plate disposed on the light emitting side is expressed by:

$$\phi_A = \phi_P + 90° \text{ or } \phi_A = \phi_P - 90°.$$

According to equation (1), the transmittance T is controlled by using a driving electric field parallel to the substrates to change the orientation of the LC molecules. If the orientation of the passing axis of one of the polarizing plates is aligned with the orientation of the initial orientation of the LC molecules, i.e., $\phi_{LC0} = \phi_P$ or $\phi_{LC0} = \phi_A$, the LCD layer assumes a dark state upon application of no driving voltage whereas assumes a bright state upon application of the driving voltage. In the latter state, when the orientation of the LC molecules are rotated by 45° by the driving electric field, the LCD unit assumes a brightest state thereof due to a maximum transmittance thereof. Alternatively, a configuration may be employed by changing the arrangement of the polarizing plates so that the LC layer assumes a dark state upon application of the driving voltage.

In the above description, it is stated that all the LC molecules sandwiched between the substrates are rotated by a uniform angle, for simplification of the description. In the display unit using the birefringence or double refraction, the light having a wavelength satisfying the relationship $\Delta n \cdot d = \lambda/2$ can pass the LC layer most efficiently. Thus, in order to obtain an excellent a white color image or a multi-color image by using a color filter, the birefringence anisotropy Δn and the thickness "d" of the LC layer are typically controlled so that the central wavelength of the spectrum of the transmitted light is set at 550 nm, i.e., $\Delta n \cdot d = 275$ nm. In a practical LCD unit, since the LC molecules disposed at the boundary between the LCD layer and the substrate is relatively firmly fixed to the substrate to assume less rotation, it is preferable that the birefringence anisotropy Δn and the thickness "d" be designed so that birefringence Δn·d resides between 280 and 330 nm.

WO91/10936 describes improvement of the view angle characteristics in the IPS-LCD unit using a TN-LC layer, and the IPS-LCD unit having such improved characteristics is expected for use as a large screen monitor.

FIG. 2 shows the view angle dependency of the relationship between the driving voltage and the light transmittance in the improved IPS-LCD unit. The view angles include an azimuth view angle $\phi_{obs}$ which is defined by a view direction of the observer measured with respect to the direction perpendicular to the extending direction of the teeth, and a polar view angle $\theta_{obs}$ which is defined by an angle with respect to the perpendicular to the substrates. In FIG. 2, curve (I) shows view angles of $\theta_{obs}=0$ and $\phi_{obs}=0$, and curve II shows $\phi_{obs}=40°$, curve III shows $\phi_{obs}=85°$, curve IV shows $\phi_{obs}=-50°$ and curve V shows $\phi_{obs}=-5°$, with the polar view angle $\theta_{obs}$ unchanged.

In the graph, the sample of the LC cell used for measurements has a configuration wherein $\phi_{LC0}=85°$, $\phi_P=85°$ and $\phi_A=-5°$. The pair of electrodes are of comb-shape, wherein the width of the teeth is 5 μm and the distance between adjacent teeth is 15 μm. In addition, the birefringence anisotropy Δn of the LC layer is 0.067 and the cell thickness "d" is 4.9 μm. The conventional IPS-LCD unit has the advantage of relatively excellent view angle characteristics wherein the view angle dependency of the voltage-transmittance characteristics is low as shown by curves I to curve V.

The conventional IPS-LCD unit has, as described above, excellent view angle characteristics compared with the LCD unit having a TN-LCD layer and using a longitudinal electric field with respect to the absence of inversion in the gray-scale level. However, the conventional IPS-LCD has a disadvantage in that the observed color changes toward blue or red color depending on the view angle.

FIG. 3 shows the spectrum of the transmitted light from the LC cell of an IPS-LCD during assuming a bright state, wherein the sample of the LC cell measured herein was the same as the LC cell having the characteristics shown in FIG. 2. In FIG. 3, the spectrum of the transmitted light shown by curves (I) to (V) was measured at various azimuth view angles $\phi_{obs}$ of 0°, 40°, 85°, -50° and -5°, with the polar view angle $\theta_{obs}=50°$ being unchanged in the LC molecules, which had an initial orientation of $\phi_{LC0}=85°$ and were applied with a driving voltage for a bright state.

The curve (I) in FIG. 3 shows that the orientation of the LC molecules is changed by the applied voltage to an orientation $\phi_{LC}=40°$ from the initial orientation $\phi_{LC0}=85°$, due to the rotation of the orientation of the LC molecules by 45°. As shown by the curve (II) in FIG. 3, the central wavelength of the transmitted light deviates at the view angle of $\phi_{obs}=40°$ to a shorter wavelength from the curve (I), thereby having a tinge of blue color. On the other hand, as shown by the curve (IV) in FIG. 3, the central wavelength of the transmitted light deviates toward a longer wavelength at the view angle of $\phi_{obs}=-50°$, thereby having a tinge of red color. In addition, similar tendency was observed at the view angles -50° and -5° opposite to the view angles as specified above.

In the LC cell of the IPS-LCD unit, as described before, since the spectrum of the transmitted light depends on the birefringence Δn·d of the LC layer, the color change shown in FIG. 3 results from the view angle dependency of the apparent birefringence of the LC layer as detailed below.

If light is incident diagonally onto the LC cell as described above, the effective birefringence anisotropy Δn' is expressed by:

$$\Delta n' = \frac{n_e n_o}{\sqrt{n_e^2 \cos^2\theta_2 + n_o^2 \sin^2\theta_2}} - n_o \quad (2)$$

wherein $\theta_2$, $n_o$, and $n_e$ are the angle between the longer axis of the LC molecules and the travelling direction of light, the refractive index of the LC layer against the ordinary ray which oscillates or polarizes in the direction perpendicular to the longer axes (optical axes) of the LC molecules, and the refractive index of the LC layer against lo extraordinary light oscillating or polarizing in parallel to the longer axes of the LC molecules, respectively.

FIGS. 4A and 4B show the view angle dependency of the birefringence index of the LC molecules of the IPS-LCD unit. In the case of perpendicular incidence, where $\theta=90°$, the apparent birefringence anisotropy Δn' is generally expressed by $\Delta n'=n_e-n_o$. At the view angle wherein the color deviates toward blue color, as shown in FIG. 4A, since the view angle is inclined toward the longer axes of the LC molecules, $\theta_2<90°$ and thus Δn' is lower. On the other hand, at the view angle where the color deviates toward red color, as shown in FIG. 4B, since the view angle is inclined toward shorter axes of the LC molecules, $\theta_2=90°$ and thus Δn'=Δn.

In the case of diagonal incidence, since the substantial thickness d' of the LC layer is expressed by $d'=d/\cos\theta_{obs}$, the substantial thickness d' is larger irrespective of the direction of the rotation of the view angle. Both the changes in the birefringence anisotropy and in the thickness of the LC layer cause the change in the birefringence Δn·d, which in turn generates color change due to the view angle.

The above description will be summarized in Table 1 as follows.

TABLE 1

|  | Δn | D | Birefringence | Rotational direction |
|---|---|---|---|---|
| View angle deviating toward blue | Smaller | Larger | Smaller | Toward longer axes |
| View angle deviating toward red | Remains same | Larger | Larger | Toward smaller axes |

JP-A-9-258369 describes improvement of the view angle characteristics of the LCD unit, which includes LC molecules having a uniform initial orientation and opposite directions in rotation of the orientation in each LC cell. FIG. 5 shows the LC cell described in the publication, wherein the LC molecules have a uniform initial orientation in the direction C6 and the pixel electrode C2 and the common electrode C3 have bends at the central region of each cell as viewed in the vertical direction. Thus, the pixel has two different directions of the electric fields C7, which rotate the LC molecules C8 in two directions. This configuration prevents inversion of gray scale levels as well as color change in the LC cell, because the two directions cancel each other in the color change.

The effective pixel area in each cell is generally defined by the total pixel area minus the area for the opaque electrodes. In the LC cell having the bends in electrodes, the bends cause reduction of ratio of the effective pixel area to the total pixel area of each cell and also may cause defects in each pixel such as an open-circuit failure.

SUMMARY OF THE INVENTION

In view of the above, it is an object of the present invention to provide an IPS-LCD unit capable of suppressing the color change depending on the view angle, inversion of gray scale levels, reduction of the ratio of the effective pixel area to the total pixel area, and defects in each pixel such as an open-circuit failure.

The present invention provides an IPS-LCD unit including first and second transparent substrates, a liquid crystal (LC) layer sandwiched therebetween to define a plurality of pixel areas, the LC layer including LC molecules having a substantially uniform initial orientation in a first direction, a pixel electrode and a common electrode disposed for each of the pixel areas for rotating the LC molecules, each of the pixel electrode and the common electrode including a plurality of first stripes extending substantially parallel to the first direction and a plurality of second stripes extending substantially perpendicular to the first direction, to define a plurality of zones in each of the pixel areas by one of the first stripes of the pixel electrode, one of the first stripes of the common electrode, one of the second stripes of the pixel electrode and one of the second stripes of the common electrode.

In accordance with the IPS-LCD unit of the present invention, the orientations of the LC molecules are rotated by the electric field generated between the pixel electrode and the common electrode in opposite directions zone by zone. Thus, the color change depending on the view angle can be cancelled by the orientations of the LC molecules in each pixel, thereby achieving excellent view angle characteristics substantially without a color change or an open-circuit failure.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 1:
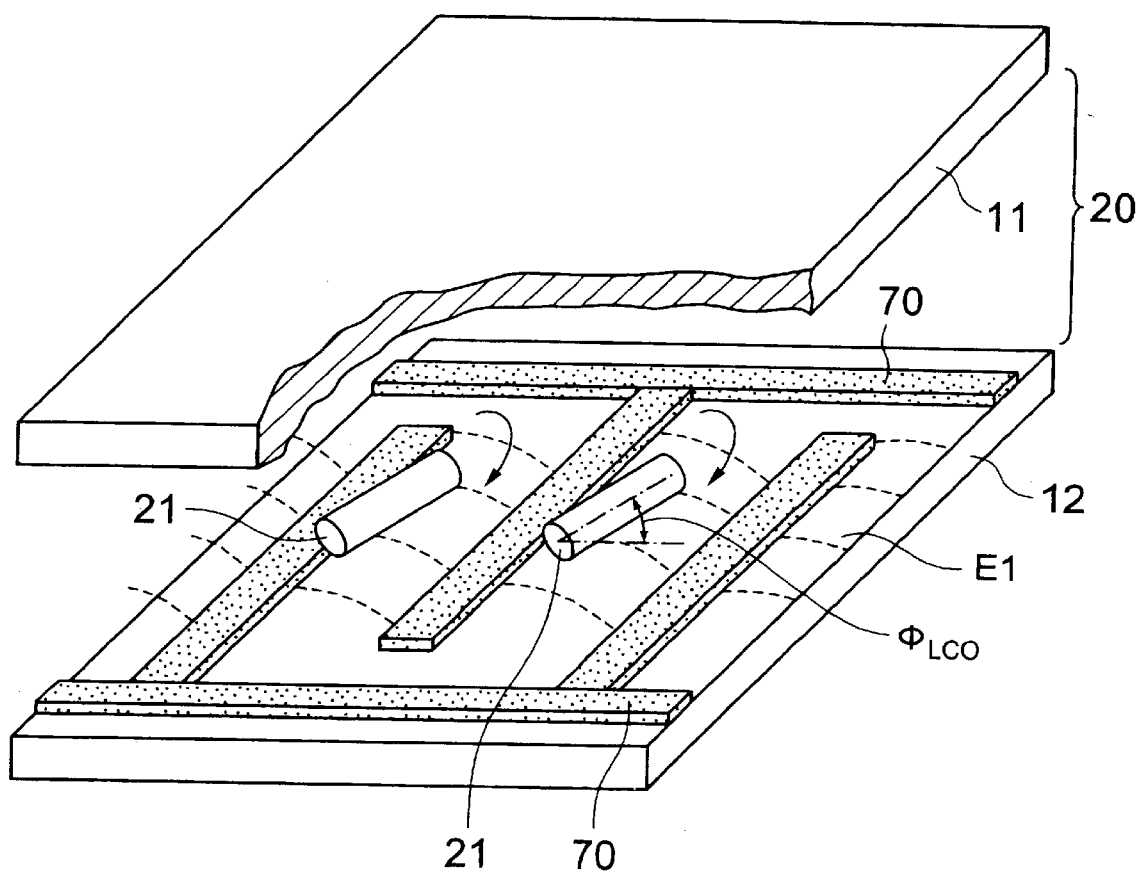
FIG. 1 is a perspective view of a conventional IPS-LCD unit.
Figure 2:
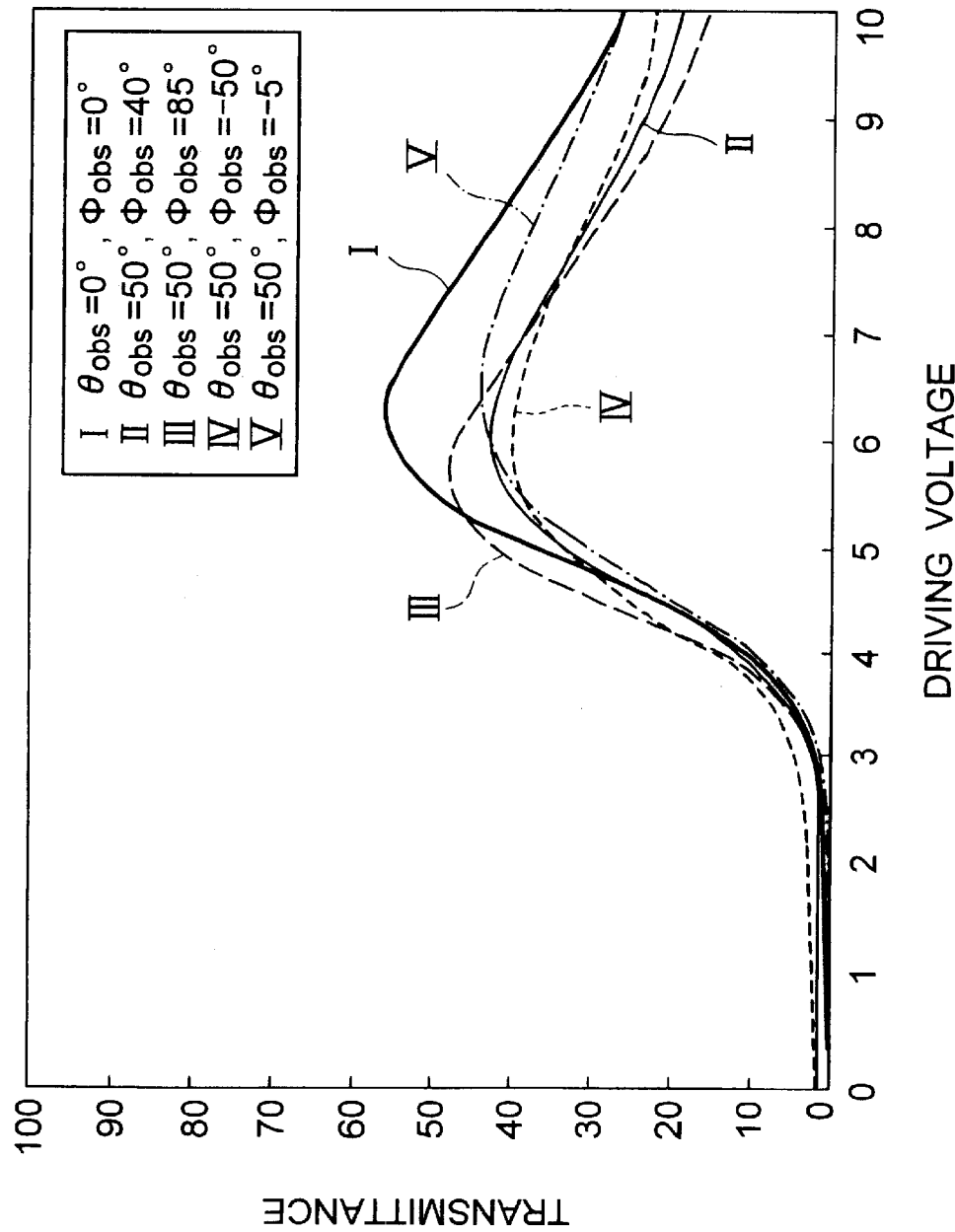
FIG. 2 is a graph of view angle dependency of the voltage-transmittance characteristics in an improved IPS-LCD unit.
Figure 3:
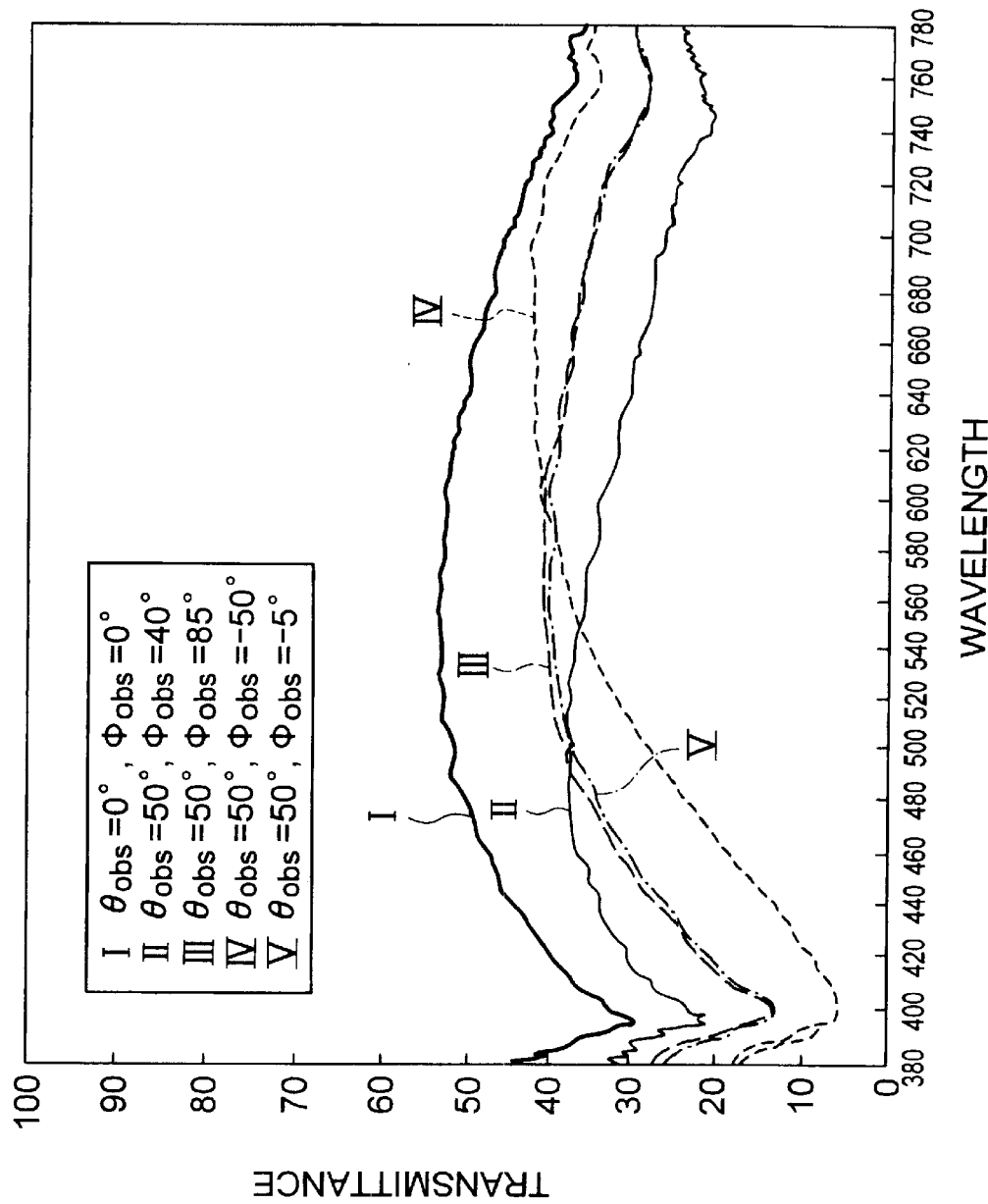
FIG. 3 is a spectrum diagram for showing view angle dependency of the transmitted light during a bright state of a LC cell in the IPS-LCD unit of FIG. 2.
Figure 4A:
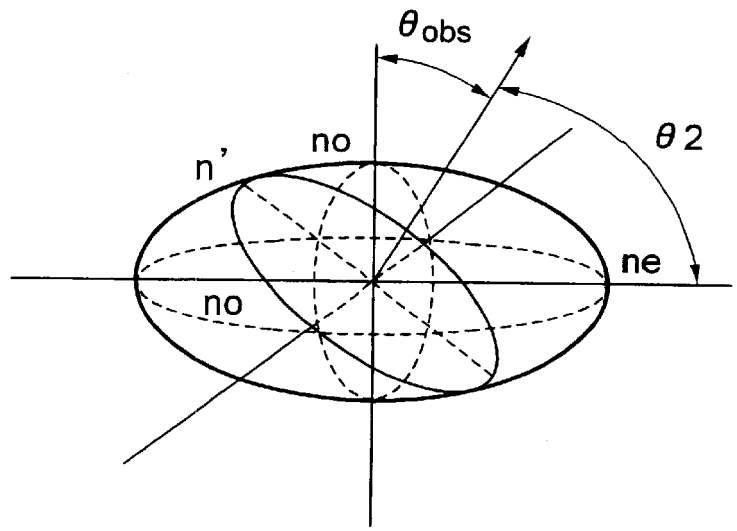
FIGS. 4A and 4B are schematic coordinate systems for showing view angle dependency of the birefringence index in the bright state of the LC cell in the general conventional IPS-LCD unit of FIG. 3.
Figure 4B:
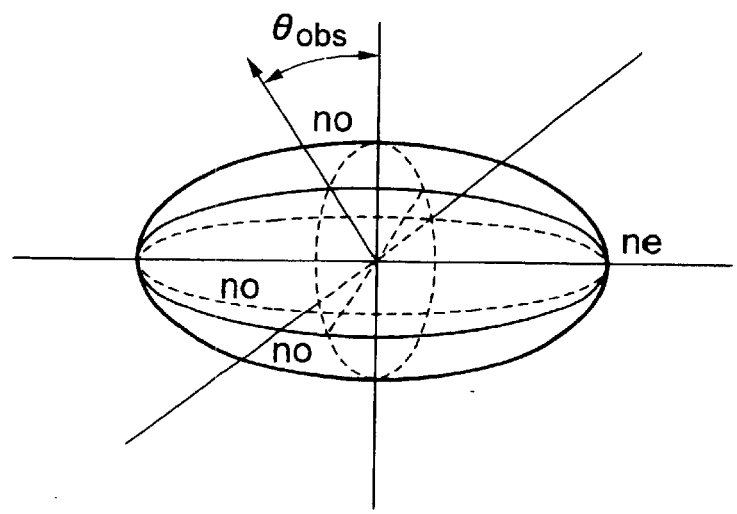
Figure 5:
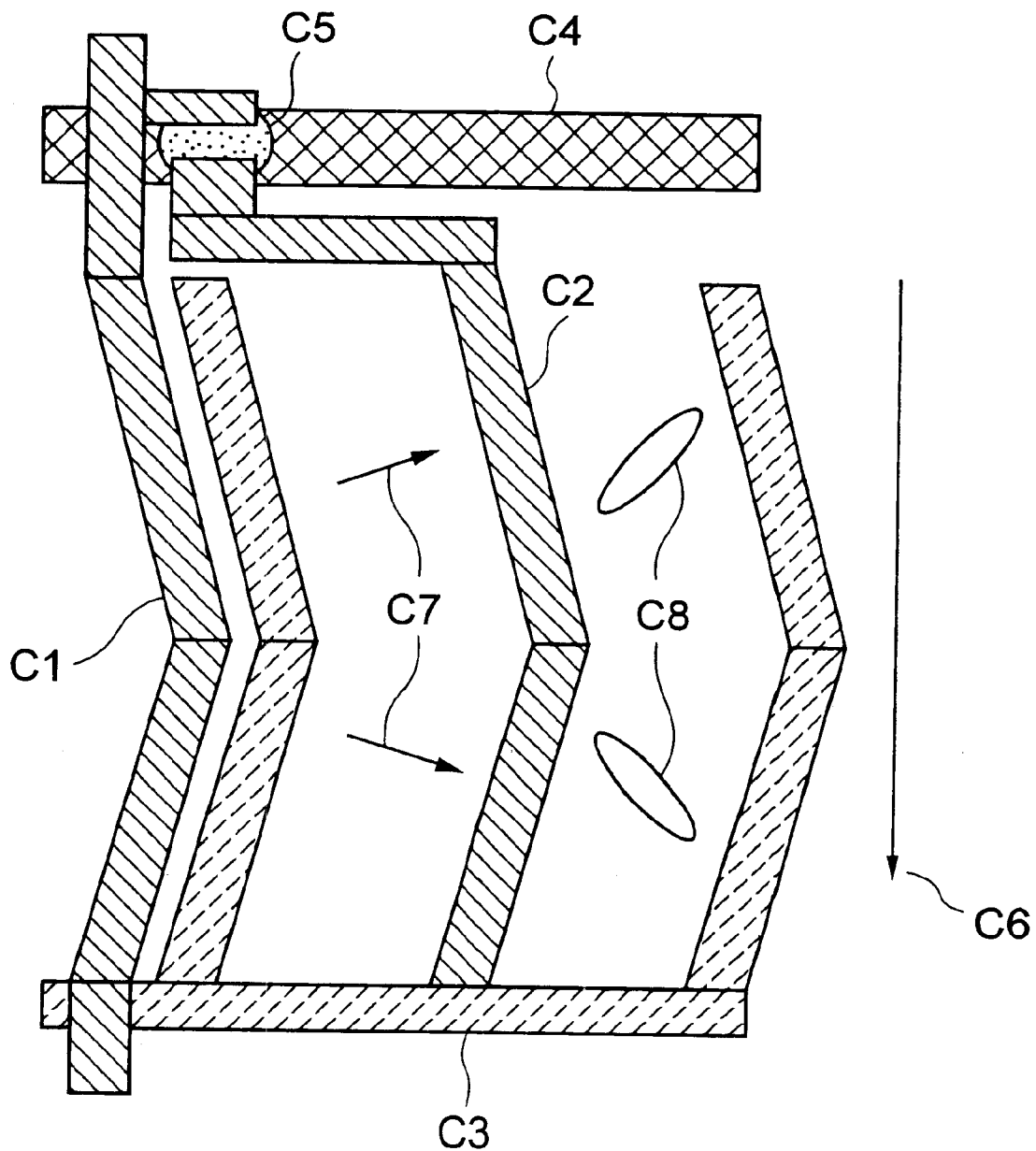
FIG. 5 is a vertical sectional view of another conventional IPS-LCD.
Figure 6:
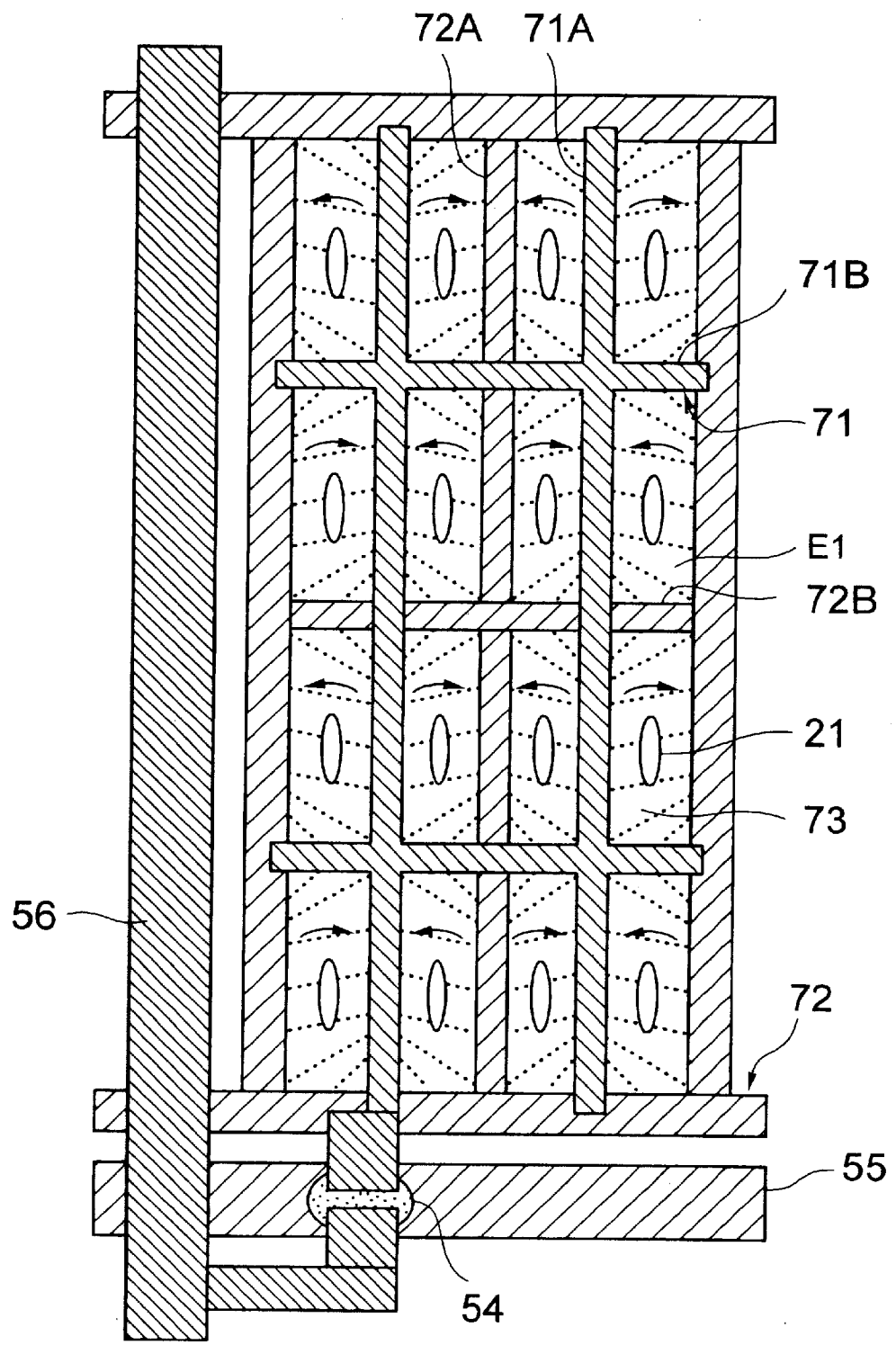
FIG. 6 is a top plan view of an IPS-LCD unit according to a first embodiment of the present invention, with the front substrate thereof omitted.

Referring to FIG. 6, there is shown a LC cell of an IPS-LCD unit according to a first embodiment of the present invention, with a front substrate being omitted. The IPS-LCD unit includes the front (first) substrate disposed at the near side of the drawing, a LC layer including LC molecules having a uniform initial alignment, and a rear (second) substrate disposed at the far side of the drawing, which are consecutively disposed in the direction opposite to the travelling direction of the back-light. The rear substrate includes a plurality of gate bus lines 55 extending in the horizontal direction, a plurality of drain bus lines 56 extending in the vertical direction. A plurality of pixel areas or LC cells are disposed in a matrix, each pixel area being substantially of a rectangular shape defined by adjacent gate bus lines 55 and adjacent drain bus lines 56. An active element 54 implemented by a thin film transistor (TFT) 54, which is disposed for each pixel area in the vicinity of the intersection between the gate bus line 55 and the drain bus line 56.

The rear substrate includes a pixel electrode 71, an insulator film not shown and a common electrode 72 consecutively disposed in the direction opposite to the travelling direction of the back-light. The pixel electrode 71 is of a lattice structure including a plurality of vertical stripes 71A extending in the vertical direction in parallel to the initial orientation of the LC molecules and a plurality of horizontal stripes 71B extending in the horizontal direction perpendicular to the initial orientation of the LC molecules. The common electrode 72 is also of a lattice structure including a plurality of vertical stripes 72A arranged alternately with the vertical stripes 71A of the pixel electrode 71 and a plurality of horizontal stripes 72B arranged alternately with the horizontal stripes 71B of the pixel electrode 71. Each pixel has a plurality (4×4 in this embodiment) of rectangular zones 21 each defined by one of the horizontal stripes 71B of the pixel electrode 71, one of the horizontal stripes 72B of the common electrodes 72, one of the vertical stripes 71A of the pixel electrode 71 and one of the vertical stripes 72A of the common electrodes 72.

Each rectangular zone 21 has a ratio of the vertical side to the horizontal side which is equal to about 3:1, namely resides between the ratios of 1.5:1 and 4:1. It is not preferable that the ratio exceeds 4:1 because the smaller number of diagonal lines of the electric field, such as shown in FIG. 6, do not effectively rotate the LC molecules. It is not preferable either that the ratio is below 1.5:1 because the smaller number of the horizontal lines of the electric field do not effectively rotate the LC molecules.

The LC molecules are subjected to a uniform initial orientation alignment wherein the LC molecules are aligned in the extending direction of the drain bus lines 56. The birefringence index of the LC molecules is positive (or of p-type) in this embodiment. If the birefringence index of the LC molecules is negative (or of n-type) contrary to the embodiment, the LC molecules should be subjected to an initial orientation alignment in the direction perpendicular to the drain bus lines 56.

When an electric field is generated by a driving voltage applied between the pixel electrode 71 and the common electrode 72 through the gate bus line 55, the drain bus line 56 and the TFT 54, the rectangular zones 21 exhibit electric fields (shown by dotted lines) having alternate directions zone by zone as viewed in the vertical and horizontal directions. This provides alternate rotations of the LC molecules in the vertical and horizontal directions in each pixel, as shown by arrows, similarly to a checkered pattern.

The checkered pattern of the rotation of the LC molecules suppresses the color change depending on the view angle. In a practical sample of the embodiment fabricated, the brightest state of the LC layer was obtained by an applied voltage of six volts.

In a modification from the first embodiment, each pixel has a larger number of zones in the vertical direction, wherein the ratio of the longer vertical side to the shorter horizontal side of the zone is 1.5:1. In a practical sample of the modified embodiment fabricated, the brightest state was obtained by an applied voltage of eight volts.

In a comparative example, an IPS-LCD unit had a lower number of rectangular zones in each pixel in the vertical direction, wherein the ratio of the longer vertical side and the shorter horizontal side of the zone was about 6:1. In the comparative example, the rotational distribution of the LC molecules in the LC layer was insufficient compared to the first embodiment and the modified embodiment therefrom, exhibiting poor characteristics of the view angle.

Figure 7:
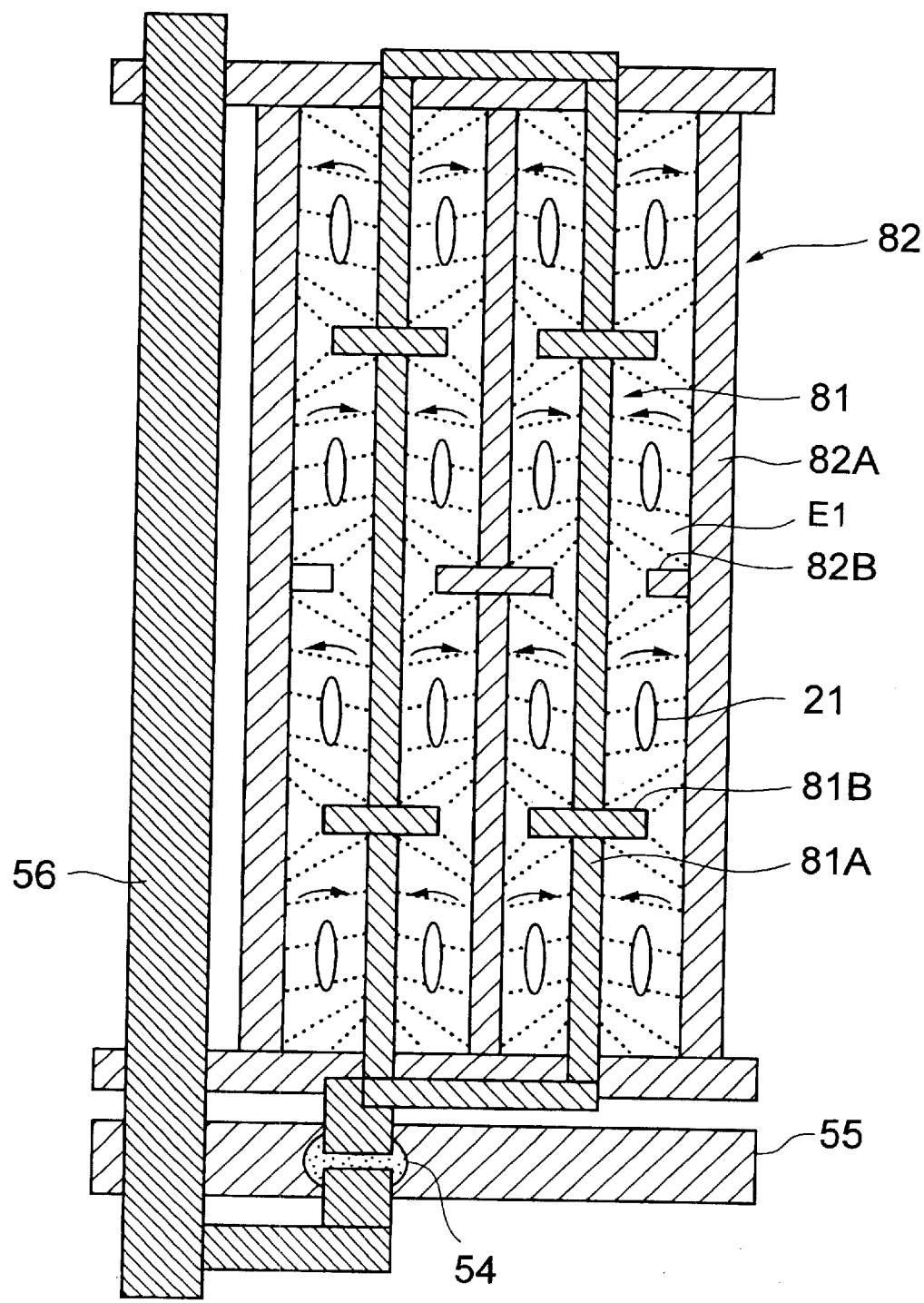
FIG. 7 is a top plan view of an IPS-LCD unit according to a second embodiment of the present invention, with the front substrate thereof omitted.

Referring to FIG. 7, an IPS-LCD unit according to a second embodiment of the present invention is similar to the first embodiment except for the configuration of both the electrodes. The pixel electrode 81 has a plurality of vertical stripes 81A each extending through the pixel area and a plurality of horizontal bars 81B having a smaller length and attached to the vertical stripes 81A. In other words, the horizontal stripes 81B of the pixel electrode 81 are separated in small pieces. The common electrode 82 has a plurality of vertical stripes 82A and horizontal bars 82B, which are similar to those of the pixel electrode 81. The vertical stripes 82A of the common electrode 82 are arranged alternately with the vertical stripes 81A of the pixel electrode 81.

The configuration of the pixel electrode 81 and the common electrode 82 of the present embodiment provides electric fields E1 similar to the electric fields of the first embodiment, and alternate orientations of the LC molecules in zones 21 having a checkered pattern. The second embodiment achieves advantages similar to the advantages of the first embodiment. The ratio of the space (or gap) between the adjacent bars 81B and 82B and the space between the vertical stripes 81A and 82A should be between 1.5:1 and 4:1, similarly to the first embodiment.

Since the above embodiments are described only for examples, the present invention is not limited to the above embodiments and various modifications or alterations can be easily made therefrom by those skilled in the art without departing from the scope of the present invention.

What is claimed is:

1. An in-plane switching scheme liquid crystal display (IPS-LCD) unit comprising first and second transparent substrates, a liquid crystal (LC) layer sandwiched therebetween to define a plurality of pixel areas, said LC layer including LC molecules having a substantially uniform initial orientation in a first direction, a pixel electrode and a common electrode disposed for each of said pixel areas for rotating said LC molecules, each of said pixel electrode and said common electrode having a lattice structure including a plurality of first stripes extending substantially parallel to said first direction and a plurality of second stripes extending substantially perpendicular to said first direction, to define a plurality of zones in each of said pixel areas by one of said first stripes of said pixel electrode, one of said second stripes of said pixel electrode and one of said second stripes of said common electrode, wherein a ratio of a gap between said second stripe of said pixel electrode and said second stripe of said common electrode to a gap between said first stripe of said pixel electrode and said first stripe of said common electrode resides between 1.5:1 and 4:1.

2. The IPS-LCD unit as defined in claim 1, further comprising a light source for irradiating back-light through said second substrate toward said first substrate.

3. The IPS-LCD unit as defined in claim 2, wherein said pixel electrode and said common electrode are disposed on said second substrate.

4. The IPS-LCD unit as defined in claim 1, wherein said first stripes and said second stripes of each of said pixel electrode and said common electrode form a lattice.

5. The IPS-LCD unit as defined in claim 1, wherein each of said second stripes is separated into a plurality of bars.

* * * * *